(12) United States Patent
Mardyla

(10) Patent No.: US 11,628,781 B2
(45) Date of Patent: Apr. 18, 2023

(54) VEHICLE INTERIOR PANEL AND METHOD OF MANUFACTURE

(71) Applicant: Faurecia Interior Systems, Inc., Auburn Hills, MI (US)

(72) Inventor: Kurt Mardyla, Croswell, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 50 days.

(21) Appl. No.: 17/321,383

(22) Filed: May 14, 2021

(65) Prior Publication Data

US 2022/0363204 A1 Nov. 17, 2022

(51) Int. Cl.
*B60R 13/02* (2006.01)

(52) U.S. Cl.
CPC ...... *B60R 13/02* (2013.01); *B60R 2013/0281* (2013.01); *B60R 2013/0293* (2013.01)

(58) Field of Classification Search
None
See application file for complete search history.

(56) References Cited

FOREIGN PATENT DOCUMENTS

| DE | 102011016843 A1 | 10/2012 |
|---|---|---|
| DE | 102016211650 A1 | 12/2017 |
| EP | 2408649 B1 | 10/2016 |
| FR | 2980446 A1 | 3/2013 |
| KR | 20140128757 A | 11/2014 |
| WO | 2010097541 A2 | 9/2010 |
| WO | 2010105855 A2 | 9/2010 |

*Primary Examiner* — Alexander S Thomas
(74) *Attorney, Agent, or Firm* — Reising Ethington P.C.

(57) ABSTRACT

A vehicle interior panel and method of making a vehicle interior panel having a substrate that can be used in either a seam-based or seamless application. The vehicle interior panel includes a substrate having a seam ditch, a first retaining step adjacent a first side of the seam ditch, and a second retaining step adjacent a second side of the seam ditch. The vehicle interior panel includes a bridging support member situated in the seam ditch at least partially between the first retaining step and the second retaining step in the substrate. A decorative covering is situated over the bridging support member, the decorative covering having a continuously contoured seamless surface that extends over the seam ditch.

12 Claims, 2 Drawing Sheets

VEHICLE INTERIOR PANEL AND METHOD OF MANUFACTURE

TECHNICAL FIELD

The invention relates to vehicle interior panels, and more particularly, to mounting decorative coverings to vehicle interior panels.

BACKGROUND

Many vehicle interior panels include a decorative covering such as a leather or textile skin layer. When including a seam in the decorative covering, adaptations typically need to be made to the underlying structural layers, such as the rigid base substrate. In some instances, a seam ditch is placed in the substrate to at least partially house the seam. EP 2408649 A2 to Schafer et al. illustrates this seam ditch structure in the substrate. However, if a manufacturer desires to use the same design for the substrate in a vehicle interior panel that will not have the seam, the gap of the seam ditch must be filled or otherwise remedied.

SUMMARY

In accordance with an embodiment, there is provided a vehicle interior panel, comprising: a substrate having a seam ditch, a first retaining step adjacent a first side of the seam ditch, and a second retaining step adjacent a second side of the seam ditch. The vehicle interior panel includes a bridging support member situated in the seam ditch at least partially between the first retaining step and the second retaining step in the substrate, a decorative covering situated over the bridging support member, the decorative covering having a continuously contoured seamless surface that extends over the seam ditch.

In some embodiments, an entire area of the decorative covering that covers the seam ditch is seamless.

In some embodiments, the first retaining step holds a first shoulder of the bridging support member and the second retaining step holds a second shoulder of the bridging support member.

In some embodiments, the first retaining step and the second retaining step open inward toward the seam ditch.

In some embodiments, the decorative covering is a multi-layer structure having a skin layer and an intermediate layer.

In some embodiments, the intermediate layer is fabric.

In some embodiments, the first retaining step and the second retaining step open outward away from the seam ditch.

In some embodiments, the first retaining step and the second retaining step hold an intermediate layer.

In some embodiments, the intermediate layer is a foam layer.

In some embodiments, the bridging support member has an elongated t-shape.

In some embodiments, a substantially continuous outer surface for the decorative covering is formed from a top surface of the bridging support member and the intermediate layer.

In some embodiments, a substantially continuous outer surface for the decorative covering is formed from a top surface of the bridging support member and the substrate.

In some embodiments, a height of a first shoulder of the bridging support member is substantially equal to a height of the first retaining step of the substrate.

In some embodiments, the bridging support member is flush with a substrate assembly that includes the substrate.

In accordance with another embodiment, there is a method of manufacturing vehicle interior panels. The method includes assembling the substrate, the bridging support, and the decorative covering to form the vehicle interior panel. The method further includes making a second substrate, with the second substrate having the same configuration as the substrate, and inserting a retainer holding a seam into the second substrate.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENTS

Described herein is a vehicle interior panel and a manufacturing method that provides a solution for substrates which are designed with a seam ditch to accommodate one or more seams in the decorative covering. With the presently described panel and manufacturing method, a manufacturer can use a substrate having the same design configuration with the seam ditch in a seamless application. This arrangement can decrease tooling costs as the same substrate design can be used in both seam-based and seamless applications. This can help streamline inventory, manufacturing, and logistics. For example, only one injection tool for the substrate is needed instead of two, which eliminates additional tool setups and manufacture.

Figure 1:
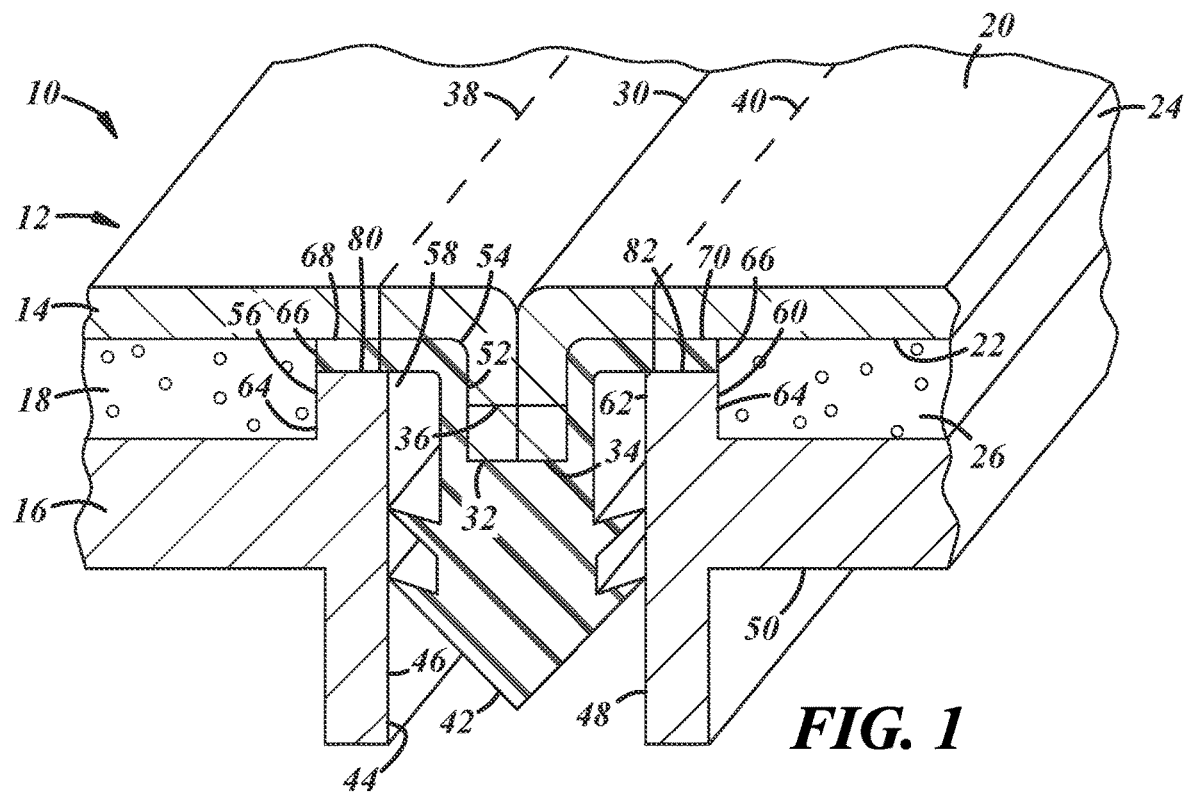
FIG. 1 is a partial perspective view of a vehicle interior panel having a seam.

FIG. 1 illustrates part of a decorative covering mounting system 10 for a vehicle interior panel 12. The vehicle interior panel 12 is a multi-layer vehicle interior panel having a decorative covering 14, a substrate 16, and an intermediate layer 18. The panel 12 may be any type of panel having a visible outer side 20 exposed to the interior of a vehicle passenger cabin when installed in the vehicle, such as an instrument panel, door panel, console lid, arm rest, pillar cover, steering wheel panel, seat covering, etc. Throughout the written description, like reference numerals denote like components. As will be detailed below, the decorative covering mounting system 10 allows for the same substrate configuration to be used in both seam-based and seamless applications.

The decorative covering 14 is the outermost layer of the panel 12 and includes the visible outer side 20 of the panel with an opposite inner side 22 facing toward the substrate 16. The decorative covering 14 can have a multi-layer structure (e.g., in some embodiments, one or more intermediate layers 18 may be part of the decorative covering itself), or may just comprise a single skin layer 24. The primary function of the decorative covering 14 and skin layer 24 is to provide a resilient, long-lasting exposed surface within the vehicle with aesthetic appeal to occupants of the passenger cabin, including desirable visual characteristics such as color, shape, and texture. The decorative covering 14 may thus include design features visible at the outer side 20, such as an embossed pattern or a paint film in the desired color. The decorative covering 14 may also at least partly provide the panel 12 with desired tactile characteristics in the likeness of furniture upholstery, such as a soft-touch or smooth feel. In some cases, the decorative covering 14 is formed with synthetic materials configured with aesthetic characteristics imitating other more expensive materials such as leather. In other implementations, the decorative covering 14 and/or skin layer 24 is a natural material such as leather. Other materials for the decorative covering 14 and/or skin layer 24 are certainly possible. Further, other interlayers or components may be included at or near the skin layer 24, depending on the desired implementation.

The substrate 16 is typically the most rigid of the illustrated panel layers and thereby provides structural support for the overlying layers at desired locations within the vehicle via attachment to other vehicle structures. Fiberglass-reinforced polypropylene having a thickness of 2 mm to 4 mm is one example of a suitable substrate 16, but various other types of materials and material combinations and/or different thickness ranges can be employed in a similar manner. The substrate 16 is a multi-use substrate in which the design and configuration of the substrate can be used in either a seam-based application (see e.g., FIG. 1) or a seamless application (see e.g., FIG. 2).

Figure 2:
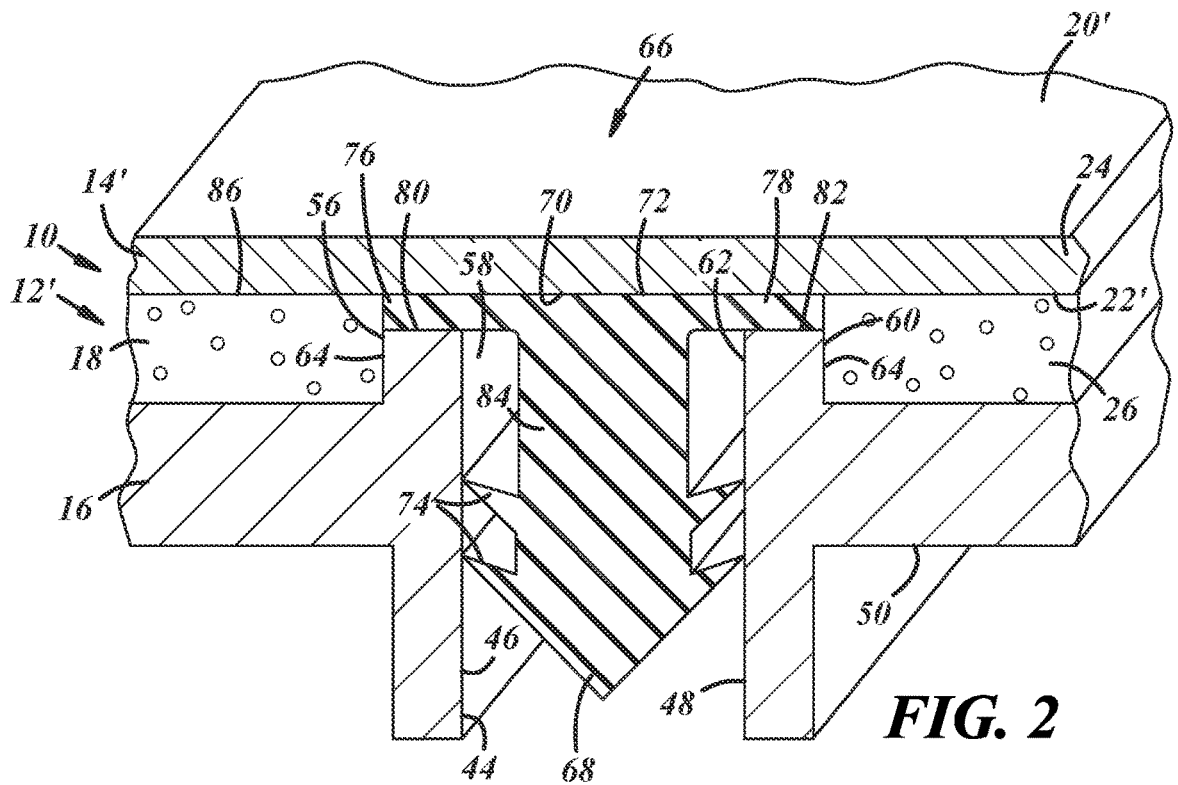
FIG. 2 is a partial perspective view of the substrate of the vehicle interior panel of FIG. 1 with a seamless decorative covering.
Figure 3:
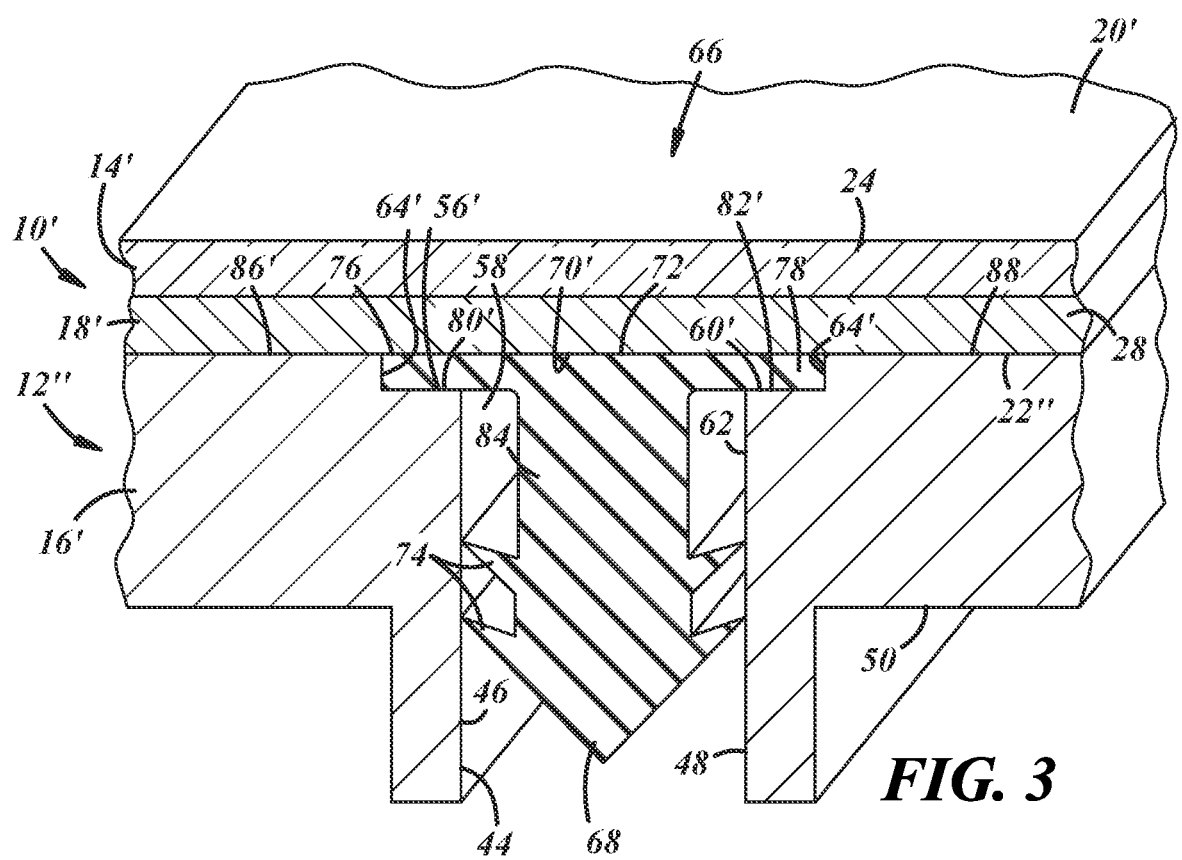
FIG. 3 is a partial perspective view of a vehicle interior panel according to another embodiment.

The intermediate layer 18 can assist the decorative covering 14 in providing desired tactile characteristics to the panel 12 in the form of cushioning that compresses when a force is applied to the outer side 20 of the panel 12 and decompresses when the force is removed to return the skin layer to its original position. The intermediate layer 18 in the embodiments in FIGS. 1 and 2 is a foam layer 26, and the intermediate layer 18' in the embodiment of FIG. 3 is a fabric or scrim layer 28. The intermediate layer 18, 18' can also provide sound deadening and/or have a non-uniform thickness to fill space between the decorative covering 14 and the substrate 16 when the respective contours of the decorative covering and substrate are different from each other. In the illustrated examples of FIGS. 1 and 2, the foam layer 26 is a backfilled or a closed pour, foam-in-place material layer formed by introducing a foam material, such as a liquid foam precursor, into a space between the decorative covering 14 and the substrate 16, with at least the decorative covering constrained in the desired final shape in a foam molding tool. The foam material expands to fill and take the shape of the space and cures to form the foam layer 26. One suitable foam layer material is polyurethane foam formed from a liquid precursor material comprising a polyol and a diisocyanate. Other foam materials (e.g., polyolefin-based) are possible, as are other foaming processes (e.g., use of a heat-activated foaming agent). The foam layer 26 may range in thickness from 1 mm to 10 mm, can be separately provided and adhered with adjacent material layers. Other materials for the intermediate layer 18 besides foam and fabric are certainly possible.

FIG. 1 illustrates an interior panel 12 having a seam 30. In this implementation, the seam 30 is a French seam having two edges 32, 34 of the decorative covering 14 stitched together with stitching 36. Stitching 38, 40 also provides a decorative element and helps to attach the decorative covering 14 to the retainer 42. Other seam configurations are certainly possible, including other functional seams and non-functional seams. Oftentimes, although not necessarily, the seam-based implementation shown in FIG. 1 is used for more luxurious applications, such as those having leather, leatherette, or another premium material for the decorative covering 14.

The retainer 42 is configured to sit in a seam ditch 44 in the substrate 16. This streamlined method of pre-positioning the seam 30 with respect to the configuration of the panel 12 helps decrease manufacturing time and provide a higher quality product without expensive tools such as seam blades. The retainer 42 has an interference fit with two elongated sidewalls 46, 48 that define the seam ditch 44 and generally run the length of the seam 30. While the seam ditch 44 is shown as extending all the way through the thickness of the substrate 16, it is possible for the seam ditch to extend only partially into the thickness of the substrate. Further, the sidewalls 46, 48 are shown as extending past an inner side 50 of the substrate 16, but it is possible that the sidewalls 46, 48 only extend to the inner side 50 of the substrate.

The retainer 42 includes a seam gap 52 that holds the edges 32, 34 of the decorative covering 14. The seam gap 52 is formed by a discontinuously contoured top surface 54 of the retainer 42. This structure for the retainer 42 is different from a continuously contoured top surface that is smooth and without kinks or breaks. The discontinuously contoured top surface 42 has four breaks or cornered kinks to form the seam gap 52. The seam gap 52 thus extends into the body of the retainer 42 to provide a recessed area for housing the edges 32, 34 of the seam 30.

The multi-use substrate 16 includes a first retaining step 56 adjacent a first side 58 of the seam ditch 44 and a second retaining step 60 adjacent a second side 62 of the seam ditch. The first side 58 and the second side 62 generally correspond in this embodiment to the elongated sidewalls 46, 48, respectively. In the embodiments illustrated in FIGS. 1 and 2, the first and second retaining steps 56, 60 face outwardly away from the seam ditch 44 and serve to seat or otherwise accommodate the intermediate layer 18 or foam layer 26. The vertical wall 64 of each retaining step 56, 60 also extends to include a side surface 66 of each shoulder 68, 70 of the retainer 42. Thus, there is a flush vertical wall 64 comprising each retaining step 56, 60 of the substrate 16.

In the embodiment of FIG. 2, the same substrate 16 is used in a seamless application. As shown, an entire area 66 of the decorative covering 14 that is situated over the seam ditch 44 is seamless. This allows the same substrate configuration to be used in both seam-based and seamless applications, which can improve inventory logistics, among other potential advantages. In some implementations, the panel 12 shown in FIG. 1 might be a more high-end vehicle application, whereas the panel 12' might be used in more of an economy type vehicle.

Instead of having the retainer 42, the FIG. 2 embodiment includes a bridging support member 68 that is situated in the seam ditch 44. This structure allows for a decorative covering 14 having a continuously contoured seamless surface 70 to be situated over the seam ditch 44. The continuously contoured seamless surface 70 is situated on the inner surface 22' of the decorative covering 14 and is distinguishable from the embodiment of FIG. 1 which has the seam 30. The continuously contoured seamless surface 70 is situated over a continuously contoured top surface 72 of the bridging support member 68. This helps provide structured support to a generally planar decorative covering 14 at all points across the seam ditch 44, thereby providing a more desirable aesthetic for the panel 12'.

Similar to the retainer 42, the bridging support member 68 has an elongated t-shape that spans the length of the seam ditch 44, and can include one or more tree-shaped barbs 74 to promote an interference fit with the substrate 16. The retainer 42 and/or the bridging support member 68 can be made of any operable material, including but not limited to a mix of polypropylene and rubber. Imparting some flexibility can help with sewing in the FIG. 1 embodiment, or with positioning and fit in either embodiment.

The bridging support member 68 includes a first shoulder 76 and a second shoulder 78, which sit on respective shoulders 80, 82 of the substrate 16 that are adjacent the first and second retaining steps 56, 60, respectively. The shoulders 76, 78 extend from a main body portion 84 of the bridging support member 68 and help define the continuously contoured top surface 72 for smoothly seating the decorative covering 14 over the seam ditch 44. The shoulders 76, 78, like the embodiment in FIG. 1, help to create a flush vertical wall 64 at the retaining steps 56, 60. This arrangement can better accommodate the foam layer 26 by providing a more unobstructed area to be filled.

The continuously contoured top surface 72 helps form a substantially continuous outer surface 86 for the decorative covering 14 to rest upon. "Substantially continuous" or "continuous" as used herein allows for gaps for tolerance between components (e.g., intermediate layer 18 and the bridging support member 68), but such gaps are not large enough to allow for noticeable depression of the decorative covering 14 into the gap. This is distinguishable, for example, from the seam gap 52 shown in the retainer 42 of FIG. 1. To have this flush arrangement between the intermediate layer 18 and the bridging support member 68, the thickness of the intermediate layer preferably corresponds to the height of the vertical wall 64, which is the combined height of each shoulder 76, 78 and vertical portion of each retaining step 56, 60. While the flush arrangement shown in the figures is completely planar, it is possible that the surface is generally curved; although, as described above, the continuity of the surface is distinguishable from point discontinuous arrangements that allow for portions of the decorative covering 14 to be housed beneath the overall panel outer surface 20, 20'.

FIG. 3 shows another embodiment of the decorative covering mounting system 10' and panel 12" in which the substrate 16' is designed to accept a seam-based retainer, as shown in FIG. 1, or the bridging support member 68 and seamless decorative covering 14'. In the FIG. 3 embodiment, the decorative covering 14' is a multi-layer structure having a skin layer 24 and a fabric layer 28 as the intermediate layer 18'. In this embodiment, the first and second retaining steps 56', 60' face inwardly and open into the seam ditch 44. In this embodiment, each shoulder 80', 82' forms the horizontal surface of the retaining step 56', 60', and each step serves to hold or accommodate each shoulder 76, 78 of the bridging support member 68. This helps provide the substantially continuous outer surface 86', which in this embodiment, is formed from the continuously contoured top surface 72 and an outer surface 88 of the substrate 16'. Accordingly, the continuously contoured seamless surface 70' can be situated over both the continuously contoured top surface 72 and the substantially continuous outer surface 86'. This provides a generally planar surface for mounting a seamless decorative covering 14'. In this embodiment, the height of each shoulder 76, 78 is substantially equal to the height of each vertical wall 64' and thus the height of each retaining step 56', 60' ("substantially equal" being equal within standard tolerance limits so as to provide the substantially continuous outer surface 86'). Additionally, in this embodiment, the continuously contoured seamless surface 70' in the decorative covering 14' is located on the fabric layer 28 which sits atop the bridging support member 68 and substrate 16'.

In both the FIG. 2 and FIG. 3 embodiments, the bridging support member 68 is flush with the substrate assembly, with the substrate assembly including either the substrate 16' alone (FIG. 3) or both the substrate 16 and intermediate layer 18 (FIGS. 1 and 2). This provides a seam gapless outer surface, or in other words, a substantially continuous outer surface 86, 86' for accommodating a seamless portion of the decorative covering 14'. Moreover, this arrangement allows a manufacturer to use the same design for the substrate 16, 16' in either seam-based or seamless applications. For example, a manufacturer can make the substrate 16, shown in FIG. 1, and install a retainer 42 with the seam 30. Then, the manufacturer can make an identically configured substrate 16, and install the bridging support member 68 with a seamless decorative covering 14'.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A vehicle interior panel, comprising:
a substrate having a seam ditch, a first retaining step adjacent a first side of the seam ditch, and a second retaining step adjacent a second side of the seam ditch;
a bridging support member situated in the seam ditch at least partially between the first retaining step and the second retaining step in the substrate, wherein the first retaining step holds a first shoulder of the bridging support member and the second retaining step holds a second shoulder of the bridging support member, and wherein the first retaining step and the second retaining step open inward toward the seam ditch or the first retaining step and the second retaining step open outward away from the seam ditch with each of the first retaining step and the second retaining step being adjacent a vertical wall that is at least partially separate from an edge of the substrate; and a decorative covering situated over the bridging support member, the decorative covering having a continuously contoured seamless surface that extends over the seam ditch.

2. The vehicle interior panel of claim 1, wherein an entire area of the decorative covering that covers the seam ditch is seamless.

3. The vehicle interior panel of claim 1, wherein the decorative covering is a multi-layer structure having a skin layer and an intermediate layer.

4. The vehicle interior panel of claim 3, wherein the intermediate layer is fabric.

5. The vehicle interior panel of claim 1, wherein the first retaining step and the second retaining step hold an intermediate layer.

6. The vehicle interior panel of claim 5, wherein the intermediate layer is a foam layer.

7. The vehicle interior panel of claim 1, wherein the bridging support member has an elongated t-shape.

8. The vehicle interior panel of claim 1, wherein a substantially continuous outer surface for the decorative covering is formed from a top surface of the bridging support member and an intermediate layer.

9. The vehicle interior panel of claim 1, wherein a substantially continuous outer surface for the decorative covering is formed from a top surface of the bridging support member and the substrate.

10. The vehicle interior panel of claim 9, wherein a height of a first shoulder of the bridging support member is substantially equal to a height of the first retaining step of the substrate.

11. The vehicle interior panel of claim 1, wherein the bridging support member is flush with a substrate assembly that includes the substrate.

12. A method of manufacturing vehicle interior panels, comprising the steps of:
assembling the substrate, the bridging support, and the decorative covering to form the vehicle interior panel of claim 1;
making a second substrate, the second substrate having the same configuration as the substrate; and
inserting a retainer holding a seam into the second substrate.

* * * * *